US006433089B1

(12) United States Patent
Nishihara et al.

(10) Patent No.: US 6,433,089 B1
(45) Date of Patent: Aug. 13, 2002

(54) METHOD FOR PRODUCING RUBBER COMPOSITION

(75) Inventors: Hajime Nishihara, Yokohama; Shinichi Shibayama, Kawasaki, both of (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/701,295

(22) PCT Filed: Apr. 13, 2000

(86) PCT No.: PCT/JP00/02401

§ 371 (c)(1),
(2), (4) Date: Nov. 28, 2000

(87) PCT Pub. No.: WO00/61662

PCT Pub. Date: Oct. 19, 2000

(30) Foreign Application Priority Data

Apr. 13, 1999 (JP) .......... 11-104721
Dec. 14, 1999 (JP) .......... 11-354566

(51) Int. Cl.$^{7}$ .......... C08L 23/00; C08L 23/04
(52) U.S. Cl. .......... 525/191; 525/222; 525/232; 525/240
(58) Field of Search .......... 525/191, 222, 525/232, 240

(56) References Cited

U.S. PATENT DOCUMENTS 5,278,272 A 1/1994 Lai et al.
5,298,211 A * 3/1994 Hamanaka et al.

FOREIGN PATENT DOCUMENTS

| | | | |
|---|---|---|---|
| JP | 40-15965 | * | 7/1965 |
| JP | 52-37953 | * | 3/1977 |
| JP | 58145741 | | 8/1983 |
| JP | 60-188412 | * | 9/1985 |
| JP | 4-114046 | * | 4/1992 |
| JP | 09104787 | | 4/1997 |
| JP | 11-310646 | * | 11/1999 |
| JP | 2000 17084 | * | 1/2000 |

* cited by examiner

*Primary Examiner*—Nathan M. Nutter
(74) *Attorney, Agent, or Firm*—Birch, Stewart, Kolasch & Birch, LLP

(57) ABSTRACT

A method for producing a rubber composition crosslinked to a crosslinking degree of 50% or higher by mixing a crosslinkable rubber (A) and a thermoplastic resin (B) and crosslinking the mixture with a crosslinking agent (C), wherein the crosslinking agent (C) is divided and added in parts to sequentially carry out the crosslinking in which the crosslinking is carried out to a crosslinking degree of 5–45% by the first addition of the crosslinking agent (C) and furthermore the crosslinking is carried out to a crosslinking degree of 50% or higher by further addition of the crosslinking agent (C).

6 Claims, 1 Drawing Sheet

METHOD FOR PRODUCING RUBBER COMPOSITION

This application is the national phase under 35 U.S.C. § 371 of PCT International Application No. PCT/JP00/02401 which has an International filing date of Apr. 13, 2000, which designated the United States of America.

TECHNICAL FIELD

The present invention relates to a method for producing rubber compositions. More particularly, it relates to a method which makes it possible to produce rubber compositions having high productivity and quality stability and excellent in appearance, fluidity and mechanical strength.

BACKGROUND ART

There have already been known thermoplastic elastomer compositions (rubber compositions) obtained by so-called dynamic crosslinking, namely, crosslinking a radical crosslinkable elastomer and a resin having no radical crosslinkability, such as polypropylene, under melt-kneading them in an extruder in the presence of a radical initiator, and these compositions are widely employed for uses such as automobile parts.

As these rubber compositions, there have been known ethylene-propylene-diene rubbers (EPDM) or olefin elastomers produced using metallocene catalysts (JP-A-9-104787). However, such compositions are not necessarily sufficient in mechanical strength, and by increasing the amount of elastomer component, the mechanical strength can be improved, but appearance and fluidity are considerably deteriorated.

On the other hand, as conventional techniques to improve properties of dynamically crosslinked olefin rubbers, there has been disclosed a method for producing thermoplastic rubber compositions by crosslinking an olefin rubber and an olefin resin, characterized in that a dynamic surface treatment is carried out repeatedly a plurality of times (JP-A-58-145741). However, this patent publication does not mention at all that the properties are remarkably improved by dividing a crosslinking agent or a crosslinking agent and a rubber into parts and adding the parts separately at a specific crosslinking degree.

Therefore, it is demanded to provide practically acceptable rubber compositions excellent in appearance, fluidity and mechanical strength.

DISCLOSURE OF INVENTION

In view of the problems mentioned above, the object of the present invention is to provide a method for producing rubber compositions having high productivity and quality stability and excellent in appearance, fluidity and mechanical strength.

As a result of intensive research conducted by the inventors on improvement of rubber compositions, it has been found that appearance, fluidity and mechanical strength are surprisingly markedly improved by dividing a crosslinking agent into parts and adding them separately, thereby to carry out sequential crosslinking. Thus, the present invention has been accomplished.

That is, the present invention relates to a method for producing a rubber composition crosslinked to a crosslinking degree of 50% or higher by mixing a crosslinkable rubber (A) and a thermoplastic resin (B) and carrying out crosslinking with a crosslinking agent (C), where the crosslinking agent (C) is divided into parts and they are added separately to carry out sequential crosslinking in which the crosslinking is carried out to a crosslinking degree of 5–45% by the first addition of the crosslinking agent (C) and, furthermore, the crosslinking is carried out to a crosslinking degree of 50% or higher by the further addition of the crosslinking agent (C), and, moreover, the present invention relates to the above-mentioned method where the crosslinkable rubber (A) is also divided into parts and they are separately added as well as the crosslinking agent (C).

BEST MODE FOR CARRYING OUT THE INVENTION

Figure 1:
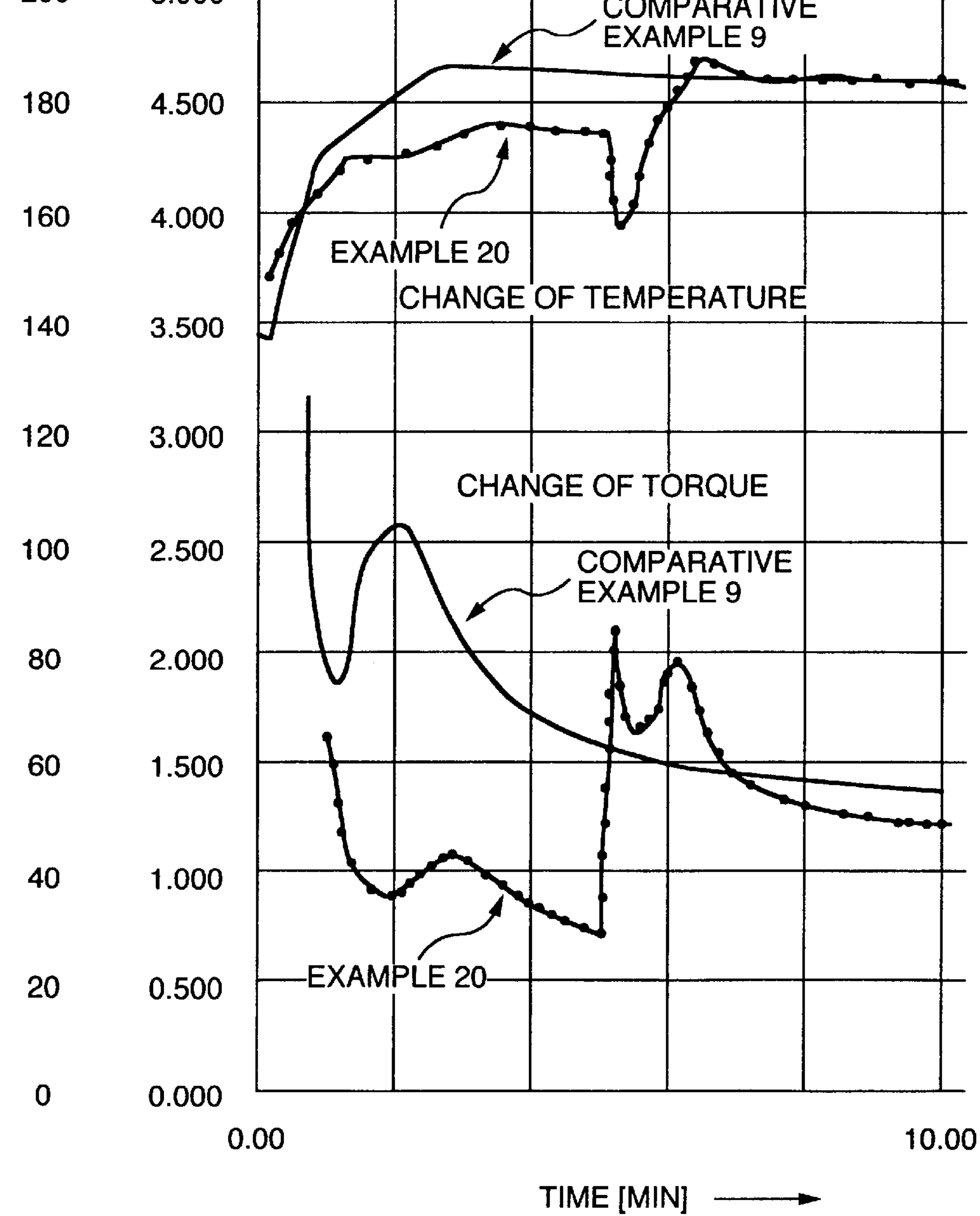
FIG. 1 shows changes of torque (kgm) and temperature (°C.) of the composition of Example 20 (two-stage crosslinking method) and that of Comparative Example 9 (one-stage crosslinking method) produced using Laboplast mill.

The present invention is a method for producing a rubber composition which comprises mixing a crosslinkable rubber (A) and a thermoplastic resin (B) and crosslinking them with a crosslinking agent (C).

Here, it is important to carrying out the crosslinking sequentially with the crosslinking agent (C) divided and added a plurality of times. By adding separately the parts of the divided crosslinking agent (C), occurrence of abrupt crosslinking can be inhibited to cause increase of crosslinking degree and prevent formation of large crosslinked products. As a result, the thermoplastic resin (B) forms a continuous phase and the crosslinkable rubber (A) of dispersion phase is present as uniform and finely divided particles, whereby fluidity and appearance are improved and high productivity and high quality stability are also attained.

In carrying out the sequential crosslinking with addition of the crosslinking agent (C) divided into parts, the crosslinking degree attained by the first addition (the first stage addition) of the crosslinking agent (C) is 5–45%, preferably 20–45%. Abrupt reaction must be avoided to take place as much as possible in each crosslinking stage. If the crosslinking degree exceeds 45% in the first stage, coarsening of the crosslinked products proceeds and deterioration of the appearance is unavoidable. On the other hand, if the crosslinking degree in the first stage is lower than 5%, the crosslinking reactions in the second stage and the following stages abruptly proceed, and not only the appearance is similarly deteriorated, but also mechanical strength is deteriorated owing to insufficient crosslinking.

The present invention will be explained in detail on each component.

In the present invention, examples of the crosslinkable rubber (A) are polystyrene rubbers, polyolefin rubbers, polyester rubbers, polyurethane rubbers, 1,2-polybutadiene rubbers and polyvinyl chloride rubbers, and polyolefin thermoplastic rubbers are especially preferred.

Of the polyolefin thermoplastic rubbers, ethylene-α-olefin copolymer rubbers are especially preferred, and as examples of them, mention may be made of ethylene-α-olefin copolymer rubbers comprising ethylene and an α-olefin of 3–20 carbon atoms (hereinafter sometimes referred to as "olefin rubber").

The α-olefins of 3–20 carbon atoms include, for example, propylene, butene-1, pentene-1, hexene-1, 4-methylpentene-1, heptene-1, octene-1, nonene-1, decene-1, undecene-1, and dodecene-1. Among them, hexene-1, 4-methylpentene-1 and octene-1 are preferred, and octene-1 is especially preferred. Octene-1 has an excellent effect to give flexibility even with addition in a small amount, and provides copolymers excellent in mechanical strength.

The olefin rubbers suitably used in the present invention are preferably produced using known metallocene catalysts or Ziegler catalysts, and especially preferably produced using metallocene catalysts.

In general, a metallocene catalyst comprises a cyclopentadienyl derivative of a metal of Group IV such as titanium, zirconium or the like and a promoter, and is not only high in activity as a polymerization catalyst, but also gives polymers narrower in molecular weight distribution and more uniform in distribution of α-olefin unit of 3–20 carbon atoms which is a comonomer unit in the copolymers as compared with polymers obtained with Ziegler catalysts. Therefore, polymers obtained by metallocene catalyst method are more uniformly crosslinked and superior in rubber elasticity.

The olefin rubbers used in the present invention are preferably those which have long-chain branches. Due to the presence of long-chain branches, density of the olefin rubbers can be made smaller as compared with the proportion (% by weight) of the copolymerized α-olefins without causing decrease of mechanical strength, and, thus, elastomers of low density, low hardness and high strength can be obtained. The olefin rubbers having long-chain branches are disclosed in U.S. Pat. No. 5,278,272, etc.

Furthermore, the olefin rubbers preferably have a peak of melting point of DSC at a temperature not lower than room temperature. When the copolymer rubbers have a peak of melting point at a temperature not lower than room temperature, they are stable in their form and excellent in handleability and less in tackiness at a temperature in the range of not higher than the melting point.

In the present invention, ethylene-α-olefin copolymer rubbers which are preferred in the crosslinkable rubbers (A) contain an ethylene unit and an α-olefin unit as essential components and, if necessary, may further contain other vinyl monomers. It suffices that ethylene and α-olefin units are contained in the crosslinkable rubbers (A), and they also include copolymers which finally contain ethylene and α-olefin units in the structure and which are obtained by hydrogenation of, for example, polystyrene, polyolefin, polyester, polyurethane, 1,2-polybutadiene and polyvinyl chloride thermoplastic elastomers.

Melt index of the crosslinkable rubber (A) used in the present invention is preferably 0.01–100 g/10 min (under load of 2.16 kg at 190° C.), more preferably 0.2–20 g/10 min. If the melt index exceeds 100 g/10 min, crosslinkability of the thermoplastic elastomer composition is insufficient, and if it is less than 0.01 g/10 min, fluidity is inferior and processability is deteriorated.

Copolymerization ratio of α-olefin in the olefin rubbers suitably used in the present invention is preferably 1–60% by weight, more preferably 10–50% by weight, most preferably 20–45% by weight. If the copolymerization ratio of α-olefin exceeds 60% by weight, decrease in hardness and tensile strength of the composition is great and if it is less than 1% by weight, hardness of the composition is high and the mechanical strength tends to decrease.

Density of the crosslinkable rubber (A) is preferably 0.8–0.9 g/cm$^3$. By using crosslinkable rubbers, especially polyolefin rubbers, having a density within the above range, thermoplastic rubber compositions excellent in flexibility and low in hardness can be obtained.

The rubber (A) in the present invention may be used in admixture of a plurality of rubbers. In this case, the processability can be further improved.

The thermoplastic resin (B) in the present invention is not limited as far as it can disperse with the crosslinkable rubber (A). Examples thereof are polystyrene, polypenylene ether, polyolefin, polyvinyl chloride, polyamide, polyester, polyphenylene sulfide, polycarbonate and polymethacrylate resins, and these may be used each alone or in admixture of two or more. Olefin resins such as propylene resins are preferred as the thermoplastic resins.

The propylene resins usable most suitably in the present invention include, for example, isotactic polypropylene homopolymers and isotactic copolymer resins (including block and random copolymers) of propylene with α-olefins such as ethylene, butene-1, pentene-1 and hexene-1.

At least one thermoplastic resin (B) selected from these resins is used in an amount of 1–99 parts by weight, preferably 5–90 parts by weight, more preferably 20–80 parts by weight, most preferably 20–70 parts by weight based on 100 parts by weight of the crosslinkable rubber (A) and the thermoplastic rubber (B) in total. If the amount is less than 1 part by weight, fluidity and processability of the composition are deteriorated and if it exceeds 99 parts by weight, the composition is insufficient in flexibility.

Melt index of the propylene resins used in the present invention is preferably 0.1–100 g/10 min (under load of 2.16 kg at 230° C.). If the melt index exceeds 100 g/10 min. heat resistance and mechanical strength of the thermoplastic elastomer composition is insufficient, and if it is less than 0.1 g/10 min, fluidity is inferior and molding processability is deteriorated.

The crosslinking agent (C) contains a crosslinking initiator (C-1) as an essential component, and, if necessary, may contain at least one crosslinking aid selected from the group consisting of a polyfunctional monomer (C-2) and a monofunctional monomer (C-3) as optional components.

The crosslinking agent (C) is used in an amount of 0.01–20 parts by weight, preferably 0.05–10 parts by weight, more preferably 0.05–3 parts by weight based on 100 parts by weight of the composition comprising the crosslinkable rubber (A) and the thermoplastic resin (B). If the amount is less than 0.01 part by weight, the crosslinking is insufficient and if it exceeds 20 parts by weight, appearance and mechanical strength of the composition are deteriorated.

The crosslinking initiators (C-1) used preferably here are radical initiators such as organic peroxides and organic azo compounds or phenolic crosslinking initiators. The radical initiators are especially preferred. Typical examples are peroxy ketals such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)cyclohexane, 1,1-bis(t-butylperoxy)cyclododecane, 1,1-bis(t-butylperoxy)cyclohexane, 2,2-bis(t-butylperoxy)octane, n-butyl-4,4-bis(t-butylperoxy)butane and n-butyl-4,4-bis(t-butylperoxy) valerate; dialkyl peroxides such as di-t-butyl peroxide, dicumyl peroxide, t-butylcumyl peroxide, α, α'-bis(t-butylperoxy-m-isopropyl)benzene, α, α'-bis(t-butylperoxy)diisopropylbenzene, 2,5-dimethyl-2,5-bis(t-butylperoxy)hexane and 2,5-dimethyl-2,5-bis(t-butylperoxy)hexyne-3; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide and m-toluoyl peroxide; peroxy esters such as t-butylperoxy acetate, t-butylperoxy isobutyrate, t-butylperoxy-2-ethyl hexanoate, t-butylperoxy lauroylate, t-butylperoxy benzoate, di-t-butylperoxy isophthalate, 2,5-dimethyl-2,5-di (benzoylperoxy)hexane, t-butylperoxymaleic acid, t-butylperoxyisopropyl carbonate and cumylperoxy octenoate; and hydroperoxides such as t-butyl hydroperoxide, cumene hydroperoxide, diisopropylbenzene hydroperoxide, 2,5-dimethylhexane-2,5-dihydroperoxide and 1,1,3,3-tetramethylbutyl hydroperoxide.

Of these compounds, preferred are 1,1-bis(t-butylperoxy)-3,3,5-trimethylcyclohexane, di-t-butyl peroxide, dicumyl peroxide, 2,5-dimethyl-2,5-bis(t-butylperoxy)hexane and 2,5-dimethyl-2,5-bis(t-butylperoxy)hexyne-3.

The above crosslinking initiator (C-1) is used in an amount of preferably 1–80% by weight, more preferably 10–50% by weight in the component (C). If the amount is less than 1% by weight, crosslinking is insufficient and if it exceeds 80% by weight, mechanical strength lowers.

In the present invention, the polyfunctional monomer (C-2) which is one component of the crosslinking agent (C) preferably has a radical polymerizable functional group as a functional group, and the functional group is most preferably vinyl group. The number of the functional group is two or more, and in the case of combination with monofunctional monomer (C-3), the number of the functional group is especially preferably three or more. Examples of the polyfunctional monomer are divinylbenzene, triallyl isocyanurate, triallyl cyanurate, diacetone diacrylamide, polyethylene glycol diacrylate, polyethylene glycol dimethacrylate, trimethylolpropane trimethacrylate, trimethylolpropane triacrylate, ethylene glycol dimethacrylate, triethylene glycol dimethacrylate, diethylene glycol dimethacrylate, diisopropenylbenzene, p-quinone dioxime, p,p'-dibenzoylquinone dioxime, phenylmaleimide, allyl methacrylate, N,N'-m-phenylenebismaleimide, diallyl phthalate, tetraallyloxyethane and 1,2-polybutadiene. Triallyl isocyanurate is especially preferred. These polyfunctional monomers may also be used in combination of two or more.

The polyfunctional monomer (C-2) is used in an amount of preferably 1–80% by weight, more preferably 10–50% by weight in the component (C). If the amount is less than 1% by weight, crosslinking is insufficient and if it exceeds 80% by weight, mechanical strength lowers.

The monofunctional monomer (C-3) used in the present invention is a vinyl monomer which can control the crosslinking reaction rate or can impart functions such as adhesivity by grafting on rubbers. It is preferably a radical polymerizable vinyl monomer, and examples thereof are aromatic vinyl monomers, unsaturated nitrile monomers such as acrylonitrile and methacrylonitrile, acrylic ester monomers, methacrylic ester monomers, acrylic acid monomers, methacrylic acid monomers, maleic acid monomers, maleic anhydride monomers and N-substituted maleimide monomers.

The monofunctional monomer (C-3) is used in an amount of preferably 1–80% by weight, more preferably 10–50% by weight in the component (C). If the amount is less than 1% by weight, control of crosslinking reaction rate or impartation of functions by the component (C-3) per se is insufficient and if it exceeds 80% by weight, mechanical strength lowers.

In the present invention, a softening agent (D) which is optionally used is a component to control the processability and the flexibility (surface hardness) of the composition comprising (A), (B) and (C), and it preferably has a viscosity of not more than 100,000 centistokes at 25° C.

Amount of the softening agent (D) is 1–500 parts by weight, preferably 1–350 parts by weight, more preferably 10–250 parts by weight, further preferably 20–200 parts by weight and most preferably 30–150 parts by weight based on 100 parts by weight of the polymer comprising the crosslinkable rubber (A) and the thermoplastic resin (B).

Examples of the softening agent (D) are process oils such as paraffinic and naphthenic process oils, phthalic esters such as dimethyl phthalate, diethyl phthalate and diisobutyl phthalate, phthalic esters having mixed groups such as butylbenzyl phthalate, aliphatic dibasic acid esters such as diisodecyl succinate and dioctyl adipate, glycol esters such as diethylene glycol dibenzoate, fatty acid esters such as butyl oleate and methyl acetyllicinoleate, and epoxy plasticizers such as epoxidized soybean oil and epoxidized linseed oil. Other examples are trioctyl trimellitate, ethylphthalylethyl glycollate, butylphthalylbutyl glycollate, tributyl acetylcitrate, chlorinated paraffin, polypropylene adipate, polyethylene sebacate, triacetin, tributyrin, toluenesulfonamide, alkylbenzene, biphenyl, partially hydrogenated terphenyl and camphor. Of these softening agents, especially preferred are process oils such as paraffinic or naphthenic process oils.

A holding agent (E) which is optionally used in the present invention is not limited as far as it is a component which holds the crosslinking agent (C) or the softening agent (D). Examples of the holding agent are inorganic or organic powders which have an average particle diameter of 0.001–10 $\mu$m and are not molten at 250° C., or compounds having a polyvalent metal salt of an organic acid, such as aluminum salt of hydroxy-di(2-ethylhexanoic acid), as an essential component and, if necessary, an organic acid such as stearic acid, or the like.

Amount of the holding agent (E) is 0.001–200 parts by weight, more preferably 0.01–150 parts by weight, further preferably 0.1–100 parts by weight, most preferably 1–100 parts by weight and extremely preferably 1–50 parts by weight based on 100 parts by weight of the polymer comprising the crosslinkable rubber (A) and the thermoplastic rubber (B).

Moreover, in the production method according to the present invention, other resins, elastomers, inorganic fillers and plasticizers can be contained in such an amount as not damaging the characteristics of the composition. The inorganic fillers used here include, for example, calcium carbonate, magnesium carbonate, silica, carbon black, glass fiber, titanium oxide, clay, mica, talc, magnesium hydroxide, and aluminum hydroxide. The plasticizers include, for example, polyethylene glycol, and phthalic acid esters such as dioctyl phthalate (DOP). Furthermore, there may be suitably used other additives such as, for example, organic and inorganic pigments, heat stabilizers, antioxidants, ultraviolet absorbers, light stabilizers, flame retardants, silicone oils, anti-blocking agents, foaming agents, antistatic agents and anti-fungus agents.

In the production method according to the present invention, there may be employed general apparatuses used for production of usual resin compositions and rubber compositions, such as Banbury mixer, kneader, single-screw extruder and twin-screw extruder. For attaining efficient dynamic crosslinking, twin-screw extruder is preferred. The twin-screw extruder is more suitable for continuous production of the composition of the present invention by uniformly and finely dispersing the olefin elastomer and the propylene resin and further adding other components to allow the crosslinking reaction to take place.

As preferred examples of the production method according to the present invention, the following processing step can be mentioned. That is, after the crosslinkable rubber (olefin rubber) (A) and the thermoplastic resin (olefin resin) (B) are added from a main feed portion together with a part of the crosslinking agent (C), the components (A), (B) and (C) are melt kneaded at the front part of the extruder to perform dynamic crosslinking, and then the remainder of the crosslinking agent (C) is added from the intermediate portion of the extruder, followed by melt kneading all the components to complete the dynamic crosslinking. Here, the larger number of division of the crosslinking agent (C) is preferred for inhibition of abrupt crosslinking, but even when the crosslinking agent (C) is divided into two parts and these are added separately (two-stage addition), appearance, fluidity, mechanical strength and quality stability can be markedly improved as compared with when the crosslinking agent (C) is added initially and all together (one-stage addition). For example, a part of the crosslinking agent (C) is added from the main feed portion and the remainder of (C) is divided and added separately from a plurality of side feed portions under melt kneading. For feeding the remainder of the crosslinking agent (C) in parts, (C) can be directly fed, but preferably (C) is fed in the form of a liquid feed by dissolving (C) in the softening agent (D). Moreover, a non-melting filler is impregnated with the crosslinking agent (C) and this may be fed. If necessary, the crosslinkable rubber (A) may be divided and fed in parts. When the divided crosslinking agent (C) is adsorbed to or absorbed in the thus divided crosslinkable rubber (A), the crosslinking efficiency is further improved.

Furthermore, as especially preferred melt extrusion method, there is used a twin-screw extruder which has a length L in the die direction starting from the material feed portion and has an L/D of 5–100 (D: diameter of barrel). It is preferred that the twin-screw extruder has a plurality of feed portions of a main feed portion and a side feed portion which differ in distance from the tip portion and has kneading parts between a plurality of the feed portions and between the tip portion and the feed portion nearer from the tip portion, and the length of each kneading part is 3D–10D.

The twin-screw extruder which is one of the apparatuses for production used in the present invention may be a twin-screw extruder of same direction-revolving type or a twin-screw extruder of different direction-revolving type. The intermeshing of the screws may be any of non-intermeshing type, partial intermeshing type and complete intermeshing type. When a uniform resin is to be obtained at a low temperature under application of a low shearing force, a different direction-revolving and partial intermeshing type screw is preferred. When a somewhat strong kneading is required, a same direction-revolving and complete intermeshing type screw is preferred. When a further stronger kneading is required, a same direction-revolving and complete intermeshing type screw is preferred.

In the production method of the present invention, it is more preferred that the following kneading degree is satisfied.

$$M=(\pi^2/2)(L/D)D^3(N/Q)$$

$$10\times10^6 \leqq M \leqq 1000\times10^6$$

In the above formulas, L denotes a length (mm) of an extruder in the die direction starting from a material adding portion, D denotes an inner diameter (mm) of a barrel of the extruder, Q denotes a discharge amount (kg/h), and N denotes the number of revolution of the screw (rpm).

It is important that the kneading degree $M=(\pi^2/2)(L/D)D^3(N/Q)$ satisfies $10\times10^6 \leqq M \leqq 1000\times10^6$. If M is less than $10\times10^6$, the dynamic crosslinking does not proceed, and, hence, the crosslinking degree becomes less than 50%, resulting in low mechanical strength, and if M exceeds $1000\times10^6$, the crosslinking degree similarly becomes less than 50% owing to excess shearing force, resulting in deterioration of mechanical strength.

In order to attain the better appearance and the higher mechanical strength, it is preferred that the melting temperatures satisfy the following relationships. That is, melt kneading is first carried out at the melting temperature $T_2$ (° C.), and, then, melt kneading is carried out at the melting temperature $T_3$ (° C.). Especially, in a melt extruder having a length L starting from the material feed opening in the die direction, the melt kneading is first carried out in a zone of the extruder of 0.1L–0.5L from the material feed opening at the melting temperature $T_2$ (° C.), and, then, melt kneading is carried out in the remainder zone of the extruder at the melting temperature $T_3$ (° C.).

Here, it is especially preferred that $T_1$ is 150–250° C., and $T_1$ or $T_2$ in each zone of the melt extruder may be a uniform temperature or may have a temperature gradient.

$T_1$: A temperature (° C.) such that (C) decomposes and then is reduced by half during one minute.

$$T_1-100<T_2<T_1+40$$

$$T_2+1<T_3<T_2+200$$

The thus obtained olefin elastomer composition can be made into various molded articles by optional molding methods. Preferred are injection molding, extrusion molding, compression molding, blow molding, calendering and expansion molding.

The present invention will be explained in more detail by the following examples and comparative examples. They should not be construed as limiting the invention in any manner. In these examples and comparative examples, test methods employed for evaluation of various properties are shown below.

(1) Crosslinking degree:

A composition of $W_0$ in weight was refluxed in 200 ml of o-dichlorobenzene for 20 hours, the resulting solution was filtered by a filter and vacuum dried at 100° C., and then the weight ($W_1$) thereof was measured. Thus, the crosslinking degree was calculated in the following manner.

$$\text{Crosslinking degree}=(W_1/W_0)\times100(\%)$$

(2) Tensile break strength [kgf/cm$^2$]:

Evaluation was conducted at 23° C. in accordance with JIS K6251.

(3) Tensile break elongation [%]:

Evaluation was conducted at 23° C. in accordance with JIS K6251.

(4) Fluidity (MFR) [g/10 min]:

Evaluation was conducted as an indication of fluidity at 230° C. under a load of 2.16 kgf in accordance with JIS K7210.

(5) Extrusion stability (stability of quality):

The resin composition was continuously melt mextruded for 10 hours using a melt extruder. Tensile break strength (Tb) of the resulting composition was measured every 1 hour, and continuous productivity (stability of quality) was evaluated from the rate of change (%) of the maximum strength $(Tb)_1$ to the average strength $(Tb)_0$.

$$\text{Rate of change of Tb } (\%)=100\times[(Tb)_1-(Tb)_0]/(Tb)_0$$

(6) Appearance:

Evaluation of appearance was conducted on the surface texture of a sheet by the following criteria.

◎: Very good.

○: Good.

Δ: Good, but having some surface roughness.

X: Wholly rough with no gloss.

The following components were used in the examples and the comparative examples.

(a) Ethylene-α-olefin copolymers:

1) A copolymer of ethylene and octene-1 (referred to as "TPE-1").

This was prepared by the process using a metallocene catalyst as disclosed in JP-A-3-163088. The copolymer had a compositional ratio of ethylene/octene-1 of 72/28 (weight ratio).

2) A copolymer of ethylene and octene-1 (referred to as "TPE-2").

This was prepared by the process using a usual Ziegler catalyst. The copolymer had a compositional ratio of ethylene/octene-1 of 72/28 (weight ratio).

3) An ethylene-propylene-dicyclopentadiene copolymer (referred to as "TPE-3").

This was prepared by the process using a metallocene catalyst as disclosed in JP-A-3-163088. The copolymer had a compositional ratio of ethylene/propylene/dicyclopentadiene of 72/24/4 (weight ratio).

(b) An olefin resin: polypropylene:

An isotactic polypropylene (referred to as "PP") manufactured by Japan Polychem Co., Ltd.

(c) A paraffin oil:

DIANA Process Oil PW-90 (referred to as "MO") manufactured by Idemitsu Kosan Co., Ltd.

(d) Crosslinking initiators: Radical initiators 1) 2,5-Dimethyl-2,5-bis(t-butylperoxy)hexane manufactured by Nippon Oil & Fats Co., Ltd. (trademark: PERHEXA 25B) (referred to as "POX-1").

2) 2,5-Dimethyl-2,5-bis(t-butylperoxy)hexyne-3 manufactured by Nippon Oil & Fats Co., Ltd. (trademark: PERHEXYNE 25B) (referred to as "POX-2").

(e) Crosslinking aids:

1) Divinylbenzene manufactured by Wako Junyaku Co., Ltd. (referred to as "DVB").

2) Triallyl isocyanurate manufactured by Nippon Kasei Co., Ltd. (referred to as "TAIC").

3) N,N'-m-phenylenebismaleimide manufactured by Ouchi Shinkou Kagaku Co., Ltd. (referred to as "PMI").

4) Maleic anhydride manufactured by Wako Junyaku Co., Ltd. (referred to as "MAH").

5) Methyl methacrylate manufactured by Asahi Kasei Kogyo K. K. (referred to as "MMA").

6) Styrene manufactured by Asahi Kasei Kogyo K. K. (referred to as "ST").

(f) Calcium carbonate:

Surface-treated heavy calcium carbonate manufactured by Dowa Calfine Co., Ltd. (referred to as "$CaCO_3$").

EXAMPLES 1–19 AND COMPARATIVE EXAMPLES 1–8

Each of the compositions shown in Table 1 comprising (A)/(B)PP/(C-1)POX/(C-2)DVB/(D)MO=65/35/0.5/1.0/45 (weight ratio) was melt kneaded in the following manner and under the following standard melting conditions using a twin-screw extruder (40 mmϕ, L/D=47) having a feed opening at the central part of the barrel and comprising 11 blocks. A two-start screw having kneading portions before and after the feed opening was used as a screw. Control of the crosslinking degree at the first stage was conducted by changing the preset temperature. That is, in the case of increasing the crosslinking degree, the reaction was carried out at a temperature lower than the preset temperature and in the case of decreasing the crosslinking degree, the reaction was carried out at a temperature higher than the preset temperature.

Standard melting conditions:

1) Melt extruding temperature: 220° C.

2) Discharge amount Q=12 kg/h

3) Extruder: Inner diameter of barrel D=25 mm

4) L/D=47 where length of the extruder is L (mm).

5) The number of revolution of screw N=280 rpm

Production conditions:

X-1: (A), (B), (C) and (D) were added simultaneously and, then, melt extruded.

X-2: At the first stage, the whole amounts of (A) and (B) and a part of (C) were mixed and reacted, and, then, at the second stage, the remainder of (C) was added from the feed opening at the center of the barrel, followed by melt extruding them.

X-3: At the first stage, the whole amounts of (A) and (B) and a part of (C) were mixed and reacted, and, then, at the second stage, the remainder of (C) was dissolved in (D) and the solution was added from the feed opening at the center of the barrel, followed by melt extruding them.

X-4: At the first stage, the whole amounts of (A) and (B) and a part of (C) were mixed and reacted, and, then, at the second stage, $CaCO_3$ was impregnated switch the remainder of (C) and this was added from the feed opening at the center of the barrel, followed by melt extruding them. The amount of $CaCO_3$ was five times the amount of the remainder of (C) added at the second stage.

Y-1: At the first stage, the whole amounts of (B) and (C) and a part of (A) were mixed and reacted, and, then, at the second stage, the remainder of (A) was added from the side feeder at the center of the barrel, followed by melt extruding them.

Y-2: At the first stage, the whole amount of (B) and a part of (A) and a part of (C) were mixed and reacted, and, then, at the second stage, the remainder of (A) and the remainder of (C) were dissolved in (D) and the solution was added from the feed opening at the center of the barrel, followed by melt extruding them.

A sheet of 2 mm thick was made from the thus obtained elastomer composition at 200° C. by compression molding and was evaluated on various properties. The results are shown in Tables 1–3.

TABLE 1

| | Example | | | | | | | Comparative Example | | |
|---|---|---|---|---|---|---|---|---|---|---|
| Composition | 1 | 2 | 3 | 4 | 5 | 6 | 7 | 1 | 2 | 3 |
| Kind of (A) | TPE-1 | | | TPE-2 | TPE-3 | | | TPE-1 | | |
| Division of (A) | | | | | No | | | | | |
| The number of division of (C) | | | | 2 | | | | | | No |
| Divisional ratio at the first stage/the second stage of (C) | | | | 50/50 | | | | | | 100/0 |
| Crosslinking degree at the first stage (%) | 5 | 32 | 45 | 30 | 33 | 31 | 32 | 3 | 55 | 73 |
| Final crosslinking degree (%) | 83 | 95 | 92 | 91 | 90 | 89 | 97 | 43 | 84 | 73 |
| Production process | | | X-3 | | | X-2 | X-4 | X-3 | | X-1 |
| Tensile break strength | 9 | 14 | 13 | 11 | 9 | 10 | 16 | 6 | 8 | 7 |
| Tensile break elongation | 410 | 580 | 570 | 470 | 400 | 450 | 650 | 360 | 370 | 340 |
| Appearance of sheet | ⊙ | ⊙ | ⊙ | ○ | ○ | ⊙ | ⊙ | × | Δ | × |
| Extrusion stability (quality stability) Rate of change of Tb (%) | 6 | 4 | 6 | 8 | 7 | 9 | 2 | 38 | 20 | 51 |

TABLE 2

| | Example | | | | | | | Comparative Example | |
|---|---|---|---|---|---|---|---|---|---|
| Composition | 8 | 9 | 10 | 11 | 12 | 13 | 14 | 4 | 5 |
| Kind of (A) | | | | | TPE-1 | | | | |
| Division of (A) | | | | | No | | | | |
| The number of division of (C) | | | 2 | | | 3 | 4 | No | |
| Divisional ratio at the stages | 10/90 | 30/70 | 50/50 | 70/30 | 90/10 | 40/30/30 | 25/25/25/25 | 0/100 | 100/0 |
| Crosslinking degree at the first stage (%) | 5 | 13 | 25 | 32 | 40 | 38 | 36 | — | — |
| Final crosslinking degree (%) | 89 | 92 | 96 | 93 | 90 | 98 | 99 | 74 | 71 |
| Production process | | | | | X-3 | | | | |
| Tensile break strength Tb Mpa | 9 | 12 | 13 | 12 | 11 | 13 | 14 | 7 | 6 |
| Tensile break elongation (%) | 400 | 530 | 550 | 460 | 400 | 580 | 630 | 320 | 300 |
| Appearance of sheet | ○ | ⊙ | ⊙ | ⊙ | ⊙ | ⊙ | ⊙ | × | × |
| Extrusion stability (quality stability) Rate of change of Tb (%) | 8 | 6 | 5 | 7 | 8 | 4 | 3 | 56 | 53 |

TABLE 3

| | Example | | | | | Comparative Example | | |
|---|---|---|---|---|---|---|---|---|
| Composition | 15 | 16 | 17 | 18 | 19 | 6 | 7 | 8 |
| Kind of (A) | | TPE-1 | | TPE-2 | TPE-3 | | TPE-1 | |
| The number of division of (A) | | | | 2 | | | | 2 |
| Divisional ratio at the first stage/the second stage | | | | 50/50 | | | | 50/50 |
| The number of division of (C) | | | | 2 | | | | No |
| Divisional ratio at the first stage/the second stage | | | | 50/50 | | | | 100/0 |
| Crosslinking degree at the first stage (%) | 6 | 30 | 44 | 31 | 32 | 4 | 53 | 74 |
| Final crosslinking degree (%) | 85 | 96 | 94 | 95 | 88 | 45 | 87 | 77 |
| Production process | | | | Y-2 | | | | Y-1 |
| Tensile break strength Tb Mpa | 10 | 16 | 14 | 13 | 10 | 7 | 8 | 7 |
| Tensile break elongation % | 430 | 620 | 590 | 490 | 400 | 350 | 370 | 340 |
| Appearance of sheet | ⊙ | ⊙ | ⊙ | ○ | ○ | × | Δ | × |
| Extrusion stability (quality stability) Rate of change of Tb (%) | 5 | 3 | 5 | 7 | 6 | 40 | 21 | 53 |

According to the results shown in Tables 1–3, it can be seen that since an abrupt crosslinking reaction is inhibited by the addition of (A) or (C) divided into parts, not only the mechanical strength is improved, but also appearance is improved since (B) becomes a continuous phase. Furthermore, it can be seen that the copolymer of ethylene and octene-1 produced using a metallocene catalyst as (A) imparts conspicuous mechanical strength.

EXAMPLE 20 AND COMPARATIVE EXAMPLE 9

The compositions disclosed in Example 1 were melt kneaded using Laboplast mill manufactured by Toyo Seiki Seisakusho Co., Ltd. under the conditions of a preset temperature of 180° C. and the number of revolution of 100 rpm and under the following production conditions.

Production conditions:

Z-1: (A), (B), (C) and (D) were added simultaneously and, then, reacted at a preset temperature of 180° C. for 10 minutes.

Z-2: At the first stage, the whole amount of (B) and a part of (A) and a part of (C) were mixed and reacted at a preset temperature of 180° C. for 5 minutes, and, then, at the second stage, the remainder of (A) and the remainder of (C) were mixed and successively reacted under the same conditions for 5 minutes.

The thus obtained elastomer compositions were evaluated in the same manner as in Example 1. The results are shown in Table 4 and FIG. 1.

TABLE 4

| Composition | Example 20 | Comparative Example 9 |
|---|---|---|
| Kind of (A) | TPE-1 | |
| The number of division of (A) | 2 | No |
| Divisional ratio at the first stage/the second stage | 54/46 | |
| The number of division of (C) | 2 | No |
| Divisional ratio at the first stage/the second stage | 55/45 | |
| Crosslinking degree at the first stage (%) | 36 | — |
| Final crosslinking degree (%) | 95 | 77 |
| Production process | Z-2 | Z-1 |
| Tensile break strength Tb Mpa | 15 | 9 |
| Tensile break elongation % | 600 | 470 |
| Appearance of sheet | ◎ | X |
| MFR g/10 min. | 0.5 | Not more than 0.01 |

According to Table 4 and FIG. 1, it can be seen that since an abrupt crosslinking reaction is inhibited by dividing each of (A) and (C) into parts and adding them separately, not only the mechanical strength is improved, but also appearance is improved since (B) becomes a continuous phase.

EXAMPLES 21–23 AND COMPARATIVE EXAMPLES 10–12

The same experiments as in Example 1 were repeated, except that the kneading degree was changed in accordance with the following definition. The results are shown in Table 5.

$$M=(\pi^2/2)(L/D)D^3(N/Q)$$

In the above formula, L denotes a length (mm) of an extruder in the die direction starting from a material adding portion, D denotes an inner diameter (mm) of a barrel of the extruder, Q denotes a discharge amount (kg/h), and N denotes the number of revolution of screw (rpm), in which D was 25 mm and L/D was 47.

TABLE 5

| | Example | | | Comparative Example | | |
|---|---|---|---|---|---|---|
| Composition | 21 | 22 | 23 | 10 | 11 | 12 |
| Kind of (A) | | | TPE-1 | | | |
| Division of (A) | | | No | | | |
| The number of division of (C) | | | 2 | | | |
| Divisional ratio at the first stage/the second stage | | | 50/50 | | | |
| Crosslinking degree at the first stage (%) | 21 | 22 | 20 | 23 | 22 | 20 |
| Final crosslinking degree (%) | 98 | 53 | 61 | 38 | 30 | 45 |
| Production process | | | X-3 | | | |
| Production conditions | | | | | | |
| N | 300 | 300 | 2750 | 300 | 300 | 2800 |
| Q | 10 | 100 | 10 | 120 | 300 | 10 |
| M (× $10^6$) | 109 | 11 | 997 | 9 | 4 | 1015 |
| Tensile break strength Tb Mpa | 14 | 10 | 11 | 6 | 5 | 7 |
| Tensile break elongation % | 600 | 450 | 500 | 350 | 250 | 370 |
| Appearance of sheet | ◎ | ○ | ◎ | × | × | Δ |
| Extrusion stability (quality stability) Rate of change of Tb (%) | 5 | 7 | 6 | 41 | 61 | 39 |

According to Table 5, it can be seen that the crosslinking degree which satisfies the requirements of the present invention can be attained by producing the compositions with the kneading degree M being in the range of $10\times10_6 \leqq M \leqq 1000\times10^6$.

EXAMPLES 24–35 AND COMPARATIVE EXAMPLES 13–14

The same experiments as in Example 1 were repeated, except that in accordance with the following definition, the melt kneading was first carried out at the melting temperature $T_2$ (° C.), and, then, the melt kneading was carried out at the melting temperature $T_3$ (° C.).

$T_1$: A temperature (° C.) such that (C) decomposes and then is reduced by half during one minute.

$$T_1-100<T_2<T_1+40$$

$$T_2+1<T_3<T_2+200$$

The results are shown in Tables 6–7.

TABLE 6

| | Example | | | | | | Comparative Example | |
|---|---|---|---|---|---|---|---|---|
| Composition | 24 | 25 | 26 | 27 | 28 | 29 | 13 | 14 |
| Kind of (A) | | | | TPE-1 | | | | |
| Division of (A) | | | | No | | | | |
| The number of division of (C) | | | | 2 | | | | |
| Divisional ratio at the first stage/the second stage | | | | 50/50 | | | | |
| Crosslinklng degree at the first stage (%) | 30 | 31 | 33 | 32 | 31 | 30 | 29 | 32 |
| Final crosslinking degree (%) | 98 | 85 | 91 | 97 | 87 | 99 | 39 | 41 |
| Production process | | | | X-3 | | | | |
| (C-1) | | | | | | | | |
| Kind | POX-1 | POX-1 | POX-1 | POX-1 | POX-1 | POX-2 | POX-1 | POX-1 |
| $T_1$ | 180 | 180 | 180 | 180 | 180 | 194 | 180 | 180 |
| $T_2$ | 150 | 85 | 215 | 150 | 150 | 150 | 80 | 150 |
| $T_3$ | 220 | 220 | 220 | 155 | 345 | 220 | 220 | 350 |
| Tensile break strength Tb Mpa | 15 | 11 | 12 | 16 | 12 | 16 | 7 | 8 |
| Tensile break elongation % | 650 | 500 | 510 | 650 | 500 | 680 | 350 | 300 |
| Appearance of sheet | ⊚ | ⊚ | ○ | ⊚ | ○ | ⊚ | × | × |
| Extrusion stability (quality stability) Rate of change of Tb (%) | 5 | 6 | 5 | 4 | 7 | 4 | 48 | 51 |

In the case of POX-1: $T_1 = 180$ $80 < T_2 < 220$ $T_2 + 1 < T_3 < T_2 + 200$
In the case of POX-2: $T_1 = 194$ $94 < T_2 < 234$ $T_2 + 1 < T_3 < T_2 + 200$

TABLE 7

| | Example | | | | | |
|---|---|---|---|---|---|---|
| Composition | 30 | 31 | 32 | 33 | 34 | 35 |
| Kind of (A) | | | TPE-1 | | | |
| Division of (A) | | | No | | | |
| The number of division of (C) | | | 2 | | | |
| Divisional ratio at the first stage/the second stage | | | 50/50 | | | |
| Crisslinking degree at the first stage (%) | 41 | 42 | 39 | 40 | 38 | 42 |
| Final crosslinking degree (%) | 96 | 99 | 99 | 93 | 94 | 95 |
| Production process | | | X-3 | | | |
| (C-1) Kind | DVB | TAIC | PMI | DVB | TAIC | TAIC |
| (C-2) Kind | | | | ST | MMA | MAH |
| Ratio of amounts of (C-1)/(C-2) | 100/0 | 100/0 | 100/0 | 50/50 | 50/50 | 50/50 |
| Tensile break strength Tb Mpa | 14 | 12 | 11 | 13 | 14 | 13 |
| Tensile break elongation % | 630 | 550 | 500 | 650 | 600 | 650 |
| Appearance of sheet | ⊚ | ○ | ○ | ⊚ | ⊚ | ⊚ |
| Extension stability (quality stability) Rate of change of Tb (%) | 5 | 6 | 6 | 3 | 4 | 5 |

According to Tables 6–7, it can be seen that the crosslinking degree which satisfies the requirements of the present invention can be attained by producing the compositions under the above melting conditions.

Moreover, it has been found that addition of TAIC or PMI causes some deterioration of appearance, but the appearance can be improved by using a monofunctional monomer together.

Industrial Applicability

The present invention provides a method for producing rubber compositions having a high productivity and a high quality stability and excellent in appearance, fluidity and mechanical strength. Since the compositions have excellent appearance, fluidity and mechanical strength, they can be used for a wide variety of uses such as automobile parts, interior automobile trims, air bag covers, mechanical parts, electric parts, cables, hoses, belts, toys, miscellaneous goods, daily necessaries, construction materials, sheets, films and others. Thus, they have a great role in industry.

What is claimed is:

1. A method for producing a rubber composition which is at least 50% crosslinked comprising combining a crosslinkable rubber (A) and a thermoplastic resin (B) together with a crosslinking agent (C) under crosslinking conditions, wherein the crosslinking agent (C) is combined with said crosslinkable rubber (A) and said thermoplastic resin (B) in step-wise manner whereby a partially crosslinked mixture is obtained having a degree of crosslinking of from 5–45% from a first addition of the crosslinking agent (C) and said partially crosslinked mixture is further crosslinked to a degree of crosslinking of 50% or higher by further addition of the crosslinking agent (C) to the partially crosslinked mixture under crosslinking conditions.

2. A method according to claim 1, wherein the degree of crosslinking attained by the first addition of the crosslinking agent (C) ranges from 20–45%.

3. A method according to claim 1 or 2, wherein the crosslinkable rubber (A) is combined with the mixture by means of separate additions of said crosslinkable rubber.

4. A method according to claim 1 wherein the crosslinking agent (C) comprises a crosslinking initiator and optionally at least one crosslinking aid selected from the group consisting of a polyfunctional monomer and a monofunctional monomer.

5. A method according to claim 1, wherein the crosslinkable rubber (A) comprises an ethylene-α-olefin copolymer comprising an ethylene unit and an α-olefin unit of 3–20 carbon atoms and the thermoplastic resin (B) is an olefin resin.

6. A method according to claim 5, wherein the ethylene-α-olefin copolymer is prepared using a metallocene catalyst.

* * * * *